United States Patent [19]

Wong

[11] 4,335,163

[45] Jun. 15, 1982

[54] HIGH GLOSS WATER-BASE COATING COMPOSITION

[76] Inventor: Jack Y. Wong, 10173 Miner Pl., Cupertino, Calif. 95014

[21] Appl. No.: 190,604

[22] Filed: Sep. 25, 1980

[51] Int. Cl.$^3$ .............................................. B05D 5/00
[52] U.S. Cl. ................... 427/256; 427/282; 427/421; 524/376; 524/378; 524/389
[58] Field of Search ............... 427/282, 421, 256; 260/40 R, 29.2 E, 22 CB, 23 P, 29.2 UA, 32.4, 32.6 R, 33.4 R

[56] References Cited

U.S. PATENT DOCUMENTS

| | | | |
|---|---|---|---|
| 2,651,871 | 9/1953 | Lynden | 427/282 |
| 3,468,694 | 9/1969 | Moritz et al. | 427/282 |
| 4,116,903 | 9/1978 | Lietz et al. | 260/29.2 E |
| 4,125,499 | 11/1978 | Howard | 260/29.2 E |
| 4,225,477 | 9/1980 | Vasishth et al. | 260/29.2 E |

*Primary Examiner*—Norman Morgenstern
*Assistant Examiner*—Janyce A. Bell
*Attorney, Agent, or Firm*—Limbach, Limbach & Sutton

[57] ABSTRACT

A high gloss water-base coating composition suitable for exterior and interior painting needs.

18 Claims, No Drawings

HIGH GLOSS WATER-BASE COATING COMPOSITION

BACKGROUND OF THE INVENTION

This invention relates to an improved water-based coating composition which on application provides a high gloss enamel finish. The composition is ideally suited as an exterior high gloss paint, especially for commercial sign painting.

Water-base coating compositions, such as latexes, acrylics, epoxides, and vinyl resins, are well known in the art. These coatings are highly desirable for a number of reasons, especially the facile manner in which they may be thinned or cleaned up during application. However, the water-base coatings have previously been unsuitable for commercial sign painting for a number of reasons.

Commercial sign painting requires a coating which dries as a very high gloss enamel. Previously water-base paints have only been able to attain, at best, a semi-gloss dried finish.

Commercial sign paint must have greater durability and resistance to sun fading than paints for other uses. It must also be rapid drying.

Therefore, to meet the requirements of commercial sign painting, oil-base enamels containing organic and petroleum solvents have been the only feasible choice.

The oil-based "bulletin enamels" or sign paint, however, which contains 28–50% organic or petroleum solvents, have many disadvantages including flammability, toxicity, air polluting tendencies, increasing scarcity and expensiveness.

OBJECTS OF THE INVENTION

It is an object of this invention to provide a water-base coating composition having an extremely high gloss enamel finish.

It is another object of this invention to provide a highly durable coating.

It is another object of this invention to provide an easily applied coating.

It is another object of this invention to provide a fast drying coating.

It is another object of this invention to provide a non-flammable coating.

It is another object of this invention to provide a non-toxic and non-polluting coating.

It is a further object of this invention to provide a coating which is water soluble prior to drying.

SUMMARY OF THE INVENTION

In furtherance of the above recited objects, an improved coating composition has been discovered comprising:

(a) 25% to 75% water by volume;
(b) 20 to 75% by weight alkyd binders;
(c) 1 to 10% by weight of a basic solution having a pH of 7.8 to 10.5;
(d) 1.0 to 10% by weight co-solvent;
(e) 0.1 to 1.0% by weight water soluble drying agents;
(f) 0.1 to 1.0% by weight defoamer; and
(g) pigments.

Within these possible ranges, the preferred ranges are as follows:

(a) 45 to 55% water by volume;
(b) 20 to 50% by weight alkyd binders;
(c) 2 to 5% by weight of a basic solution having a pH of 8.0 to 8.5;
(d) 1.5 to 3.5% by weight co-solvent;
(e) 0.25 and 0.75% by weight water soluble drying agents;
(f) 0.2 to 0.5% by weight defoamer; and
(g) pigments.

DETAILED DESCRIPTION

The composition of the invention contains 10 to 38% and preferably 10 to 25% each of two water reducible alkyd binders. The exact weight percentage of each alkyd is dependent upon the desired pigmentation. Generally, the ratio is approximately 1:1. Since pigments oxidize at different rates and have different oil absorption rates, the ratio of alkyds may need to be adjusted to control drying time and the desired viscosity for brushing consistency.

One alkyd is a vinyltoluene co-polymer containing a medium weight safflower oil fatty acid, isophthalic acid polyester and trimellitic acid. This alkyd provides the composition with a high gloss not previously found in water base paints. This alkyd also provides upon drying a hard coating having excellent water resistance and scrubability. Gloss may be measured by taking readings of a painted surface at 60° angles with an instrument such as the Gloss Gard Digital Gloss Meter, GG7360, Ser. No. 2040, manufactured by Gardner Co. The following are examples of the gloss readings of various types of paint.

TABLE I

| Type paint | Average Gloss Reading |
| --- | --- |
| Flat latex | 0 |
| Semi-gloss water-base | 25–40 |
| Other high gloss water-base | 50–75 |
| High gloss oil base sign | 75–85 |
| Ryan 100 Line Oil-base Bulletin Enamels | 83–89 |
| Water Base Test Paint | 93–101 |

The second alkyd is an isophthalic acid medium weight soy bean oil compound. This adds body to the coating, thus preventing "sagging" and "bleeding" of the paint. Additionally, it provides the coating with a smooth brushing consistency. This latter advantage is particularly important when the paint is used for lettering.

The acidic alkyds are converted to readily soluble alkali amides by the addition of a basic solution. Suitable bases include, for example, 29% aqua ammonia, sodium hydroxide, triethylamine, and other organic amines. A pH in the range of 7.8 to 10.5 and preferably 8.0 to 8.5, results in the desired water solubility. Generally, 1 to 10% by weight and preferably 2 to 5% by weight of base is required to neutralize the alkyds and obtain a slightly basic solution.

A co-solvent is added to the composition to provide brushing consistency and smoothness in application. Among the many appropriate solvents are: isopropyl alcohol; butanol; Propasal P, manufactured by Union Carbide; and any suitable glycol ether such as ethylene glycol monobutyl ether and ethylene glycol monoethyl ether. Generally, the co-solvent comprises approximately 1 to 10% by weight and preferably 1.5 to 3.5% by weight of the coating composition.

Normally, water-base coatings require longer drying times or higher temperatures than that required to evaporate the organic solvents contained in similar oil-base coatings. To overcome this disadvantage both the co-solvent and additional drying agents are added to the composition to reduce drying time.

To ensure drying both above and below the surface water soluble drying agents comprising 0.10 to 2%, but preferably 0.25 to 0.75%, by weight of the composition are used. The surface drying agent is a cobalt water base drier. Below surface drying is facilitated by the use of manganese, zirconium, calcium and lead compositions. Lead compositions are, however, undesirable due to their toxicity. The ratio of driers is not critical but the following are possible ratios of commercially available driers:

(a) Cobalt Hydro-Cure[1] Manganese Hydro-Cure in a 1:4 weight ratio.
(b) Cobalt Hydro-Cure: Manganese Hydro-Cure: Zirconium Hydro-Cem in a 1:2:1 weight ration.
(c) Cobalt Hydro-Cure II: Calcium Hydro-Cem: Zirconium Hydro-Cem in a 1:3:1.5 weight ratio.

[1]. "Hydro-Cure" and "Hydro-Cem" are the trademarks of Mooney Chemicals, Inc.

In a 100 gallon batch of the composition of this invention the following combination of drying agents was successfully used: 1.89 pounds (lb.) of Cobalt Hydro-Cure II; 5.68 lb. of 5% Calcium Hydro-Cem; and 2.84 lb. of 12% Zirconium Hydro-Cem.

Any suitable defoamer may be used to eliminate foam and bubbles. A commercially available product, PATCOTE 531[2] Defoamer has proven satisfactory.

[2]. PATCOTE is the trademark of C. J. Patterson Company.

The coating compositions of this invention are generally prepared in the following manner. Selected pigments are blended with water, part of the alkyd responsible for gloss, co-solvent and base. The mixture is subjected to high speed dispersion. It is then ground in a sandmill to a fineness of 7+ on a grind gauge, such as a Hegman Grind Gauge, having a range of 0 to 7. The resulting product is a thick paste.

The paste is combined with a mixture of the remaining alkyds, water, base, drying agents and the defoamer. This mixture is subjected to dispersion. The product is an aqueous dispersion ready for canning.

The following are examples of specific preparations of the compositions of this invention.

EXAMPLE 1

Preparation of #780 Gloss White Bulletin Enamels

The following components were combined in a 60 gallon vessel: 32.5 pounds (lbs.) of vinyltoluene alkyd; 80 fluid ounces (oz.) of ethylene glycol mono n-butyl ether; and 40 oz. of 29% aqua ammonia solution, 20 lb. of water, and 125 lb. white titanium dioxide pigment. The mixture was dispersed for ten minutes at high speed (10) with a Hockmeyer Discperser. The mixture was ground to fineness in a sandmill.

A second mixture was prepared consisting of 47 lbs. of isophthalic acid alkyd, 20 lbs. of the remaining vinyltoluene alkyd, 74 lbs. water, 0.82 lbs. or 16 ounces (oz.) of PATCOTE 531 Defoamer, 4.81 lbs. or 80 oz. of ammonium hydroxide, 0.23 lbs. Cobalt Hydro-Cure, and 0.90 lbs. of Manganese Hydro-Cure.

The first mixture was lowered into the second mixture and dispersed at high speed. The product yield was 30 gallons of enamel.

EXAMPLE 2

Preparation of #756 Brilliant Blue Bulletin Enamel

In a 60 gallon vessel were added 16.25 lbs. of vinyltoluene alkyd, 40 oz. of ethylene glycol mono n-butyl ether, 20 oz. of 29% aqua ammonia and 16.5 lbs. of water. To this mixture the following pigments were added: 2.75 lbs. white, 1.75 lbs. BT-366-D blue, 3.65 lbs. of BT-427-D blue and 1 lb. of carmine. The mixture was dispersed and the product ground as in Example 1.

The mixture was let down directly from the sandmill into a second mixture. This latter mixture contained 34 lbs. of isophthalic acid alkyd, 20 lbs. of vinyltoluene alkyd, 48 lbs. of water, 3 lbs. of triethyl amine, 0.23 lbs. of Cobalt Hydro-Cure, 0.45 lbs. of Manganese Hydrocure, and 0.61 lbs. of PATCOTE 531 Defoamer.

After a final ten minutes of dispersing, 24 gal. of product was produced.

The characteristics of the composition of this invention and its suitability for commercial sign painting appear in Table II.

TABLE II

| Dry Time | Brushing Ease (10 for best) |
| --- | --- |
| Set = 1 to 2 hrs. | General Index = 9 |
| Through = 4 to 6 hrs. | Brush marking = 10, excellent |
| Hard = 10 to 14 hrs. | Sag Index = 9 |
| Scrubability | General Grind = 7+ |
| At 1000 cycles = excellent | |
| | Gloss, 60° = 93 to 101 |
| Recoating Critical Period | |
| metal = 6 to 25 hrs. | Viscosity = 85 KU |
| wood = 10 to 20 hrs. | |
| | Total NV (by Wt.) = 48% |

| Toxicity, FDA Status, and Safe Handling | |
| --- | --- |
| (1) | No particular hazard in industrial use, and presents no unusual fire hazard. |
| (2) | D.O.T. Classification: non-flammable and non-hazardous. |
| (3) | Since it does not contain prohibited substances, approval by FDA for food contact applications is possible upon presentation of proper petition. |

The composition of this invention was developed to meet the special problems of commercial sign painting. However, it has proven to have many other uses.

Water base spray paints have previously been unavailable, but it has been discovered that the composition of this invention is a suitable spray paint when diluted with water in an approximate 1:1 ratio so that the composition is from 25 to 90%, and preferrably 45 to 80% by volume water.

The water base spray paint of this invention is superior to oil base spray paints in a number of ways. Although it requires no primers, it has excellent adhesion to a variety of surfaces, such as wood, paper, metal, cement. It is non-flammable, non-toxic and non-polluting. These characteristics are particularly valuable given the nature of spray applications.

The compositions of this invention, either undiluted or with adjustment of the alkyd ratios to increase viscosity of the composition, also provide excellent ink for silk screening. Although there are many water base inks, there have been no high gloss water-base inks prior to this invention. The advantage of water-base inks is that the silk screen can be water-washed rather than washed with expensive, dangerous organic solvents.

For suitable silk screening purposes the water by volume of the composition is reduced to 18 to 56% and preferably 34 to 42%. The percentage of alkyds is increased to 20 to 93% and preferably 25 to 62%.

I claim:

1. A water-base coating composition comprising:
   (a) 25% to 75% water by volume;
   (b) 20 to 75% by weight of an alkyd of vinyltoluene co-polymer containing a medium weight safflower oil fatty acid, isophthalic acid polyester and trimellitic acid and an alkyd of isophthalic acid medium weight soy bean oil compound in an approximately 1:1 ratio;
   (c) 1 to 10% by weight of a basic solution having a pH of 7.8 to 10.5;
   (d) 1.0 to 10% by weight co-solvent;
   (e) 0.1 and 1.5% by weight water soluble drying agents;
   (f) 0.1 to 1.0% by weight defoamer; and
   (g) pigments.

2. A water-base coating composition according to claim 1 comprising:
   (a) 45 to 55% water by volume;
   (b) 20 to 50% by weight of an alkyd of vinyltoluene copolymer containing a medium weight safflower oil fatty acid, isophthalic acid polyester and trimellitic acid and an alkyd of isophthalic acid medium weight soy bean oil compound in an approximately 1:1 ratio,
   (c) 2 to 5% by weight of a basic solution having a pH of 8.0 to 8.5;
   (d) 1.5 to 3.5% by weight co-solvent;
   (e) 0.25 and 0.75% by weight water soluble drying agents;
   (f) 0.2 to 0.5% by weight defoamer; and
   (g) pigments.

3. A composition according to claim 2 in which the basic solution is aqua ammonia.

4. A composition according to claim 2 in which the basic solution is an amine.

5. A composition according to claim 7 in which the basic solution is triethylamine.

6. A composition according to claim 2 in which the co-solvent is selected from the group consisting isopropyl alcohol, butanol and glycol ether.

7. A composition according to claim 2 in which one drying agent is a cobalt water base drier.

8. A composition according to claim 2 in which the second drying agent is selected from the group consisting of manganese, zirconium, calcium and lead compounds.

9. An improved method of commercial sign painting wherein the improvement lies in the application of a water-base coating composition comprising:
   (a) 25% to 75% water by volume;
   (b) 20 to 75% by weight of an alkyd of vinyltoluene co-polymer containing a medium weight safflower oil fatty acid, isophthalic acid polyester and trimellitic acid and an alkyd of isophthalic acid medium weight soy bean oil compound in an approximately 1:1 ratio;
   (c) 1 to 10% by weight of a basic solution having a pH of 7.8 to 10.5;
   (d) 1.0 to 10% by weight co-solvent;
   (e) 0.1 and 1.5% by weight water soluble drying agents;
   (f) 0.1 to 1.0% by weight defoamer; and
   (g) pigments.

10. A method of commercial sign painting according to claim 9 in which the coating composition is comprised of the following:
    (a) 45% to 55% water by volume;
    (b) 20 to 50% by weight of an alkyd of vinyltoluene co-polymer containing a medium weight safflower oil fatty acid, isophthalic acid polyester and trimellitic acid and an alkyd of isophthalic acid medium weight soy bean oil compound in an approximately 1:1 ratio;
    (c) 2 to 5% by weight of a basic solution having a pH of 8.0 to 6.5;
    (d) 1.5 to 3.5% by weight co-solvent;
    (e) 0.1 and 1.0% by weight water soluble drying agents;
    (f) 0.1 to 1.0% by weight defoamer; and
    (g) pigments.

11. A method according to claim 10 in which the basic solution is aqua ammonia.

12. A method according to claim 10 in which the basic solution is an amine.

13. A method according to claim 12 in which the basic solution is triethylamine.

14. A method according to claim 10 in which the co-solvent is selected from the group consisting isopropyl alcohol, butanol and glycol ether.

15. A method according to claim 10 in which one drying agent is a cobalt water base drier.

16. A method according to claim 10 in which the second drying agent is selected from the group consisting of manganese, zirconium, calcium and lead compounds.

17. An improved method of spray painting wherein the improvement lies in the application of a coating composition comprising:
    (a) 25% to 75% water by volume;
    (b) 20 to 75% by weight of an alkyd of vinyltoluene co-polymer containing a medium weight safflower oil fatty acid, isophthalic acid polyester and trimellitic acid and an alkyd of isophthalic acid medium weight soy bean oil compound in an approximately 1:1 ratio;
    (c) 1 to 10% by weight of a basic solution having a pH of 7.8 to 10.5;
    (d) 1.0 to 10% by weight co-solvent;
    (e) 0.1 and 1.5% by weight water soluble drying agents;
    (f) 0.1 to 1.0% by weight defoamer; and
    (g) pigments.

18. A method of spray painting according to claim 17 wherein the coating composition is comprised of the following:
    (a) 45 to 80% water by volume;
    (b) 20 to 50% by weight of an alkyd of vinyltoluene co-polymer containing medium weight safflower oil fatty acid, isophthalic acid polyester and trimellitic acid and an alkyd of isophthalic acid medium weight soy bean oil compound in an approximately 1:1 ratio;
    (c) 2 to 5% by weight of a basic solution having a pH of 8.0 to 8.5;
    (d) 1.5 to 3.5% by weight co-solvent;
    (e) 0.25 and 0.75% by weight water soluble drying agents;
    (f) 0.2 to 0.5% by weight defoamer; and
    (g) pigments.

* * * * *